United States Patent
Shaaban et al.

(10) Patent No.: US 12,361,385 B2
(45) Date of Patent: Jul. 15, 2025

(54) SYSTEM AND METHOD FOR INTER-FIRM, INTER-OFFICE, INTER-COMPANY BILLING AND FINANCIAL PROCESSING AND TRANSFER POSTING

(71) Applicants: Ahmed Farouk Shaaban, South Barrington, IL (US); Venkat Thandra, South Barrington, IL (US)

(72) Inventors: Ahmed Farouk Shaaban, South Barrington, IL (US); Venkat Thandra, South Barrington, IL (US)

( * ) Notice: Subject to any disclaimer, the term of this patent is extended or adjusted under 35 U.S.C. 154(b) by 1063 days.

(21) Appl. No.: 16/410,772

(22) Filed: May 13, 2019

(65) Prior Publication Data

US 2019/0279161 A1 Sep. 12, 2019

Related U.S. Application Data

(63) Continuation of application No. 14/833,032, filed on Aug. 21, 2015, now abandoned.
(Continued)

(51) Int. Cl.
*G06Q 10/1091* (2023.01)
*G06Q 30/04* (2012.01)
*G06Q 40/12* (2023.01)

(52) U.S. Cl.
CPC ......... *G06Q 10/1091* (2013.01); *G06Q 30/04* (2013.01); *G06Q 40/125* (2013.12)

(58) Field of Classification Search
CPC .......... G07F 19/00; H04L 9/00; G06Q 10/00; G06Q 40/00; G06Q 10/1091; G06Q 30/04; G06Q 40/125
(Continued)

(56) References Cited

U.S. PATENT DOCUMENTS 6,038,547 A 3/2000 Casto
6,185,514 B1 2/2001 Skinner
(Continued)

FOREIGN PATENT DOCUMENTS

CN 102365650 A 2/2012
CN 104081425 A 10/2014
(Continued)

OTHER PUBLICATIONS

IP.com "Managing Transaction Billing Across a Plurality of Billing Sources Utilizing an Interface" IP.com Prior Art Database Technical Disclosure, pp. 5-25 (Year: 2009).*
(Continued)

*Primary Examiner* — Fahd A Obeid
*Assistant Examiner* — Jessica E Sullivan
(74) *Attorney, Agent, or Firm* — Global IP Counselors, LLP

(57) ABSTRACT

The present invention consists of an improved System and Method for raising inter-firm invoices, processing transfers and postings. The system and method provides for raising invoices and processing transfers for processing directly between two entities, or through a plurality of entities all in one streamlined system. With this improved system and method, associated businesses or organizations may collect their cost sharing expenses across multiple entities seamlessly. Further, each entity may specify the frequency to receive invoices from other entities. With such an improved System, Inter-firm transfers and postings can be readily accomplished immediately, processing hundreds of thousands of time entries in less than one business day.

14 Claims, 6 Drawing Sheets

Related U.S. Application Data

(60) Provisional application No. 62/070,882, filed on Aug. 21, 2014.

(58) Field of Classification Search
 USPC .......................................................... 705/34
 See application file for complete search history.

(56) References Cited

U.S. PATENT DOCUMENTS

| | | | |
|---|---|---|---|
| 6,622,128 | B1 | 9/2003 | Bedell et al. |
| 6,747,679 | B1 | 6/2004 | Finch, II |
| 6,832,176 | B2 | 12/2004 | Hartigan |
| 7,209,897 | B2 * | 4/2007 | Ghiloni .................. G06Q 20/10 705/40 |
| 7,275,038 | B1 * | 9/2007 | Weinstock ........... G06Q 10/025 705/5 |
| 7,343,316 | B2 | 3/2008 | Goto |
| 7,835,984 | B2 * | 11/2010 | Snyder .................. G06Q 40/02 705/40 |
| 8,209,243 | B2 | 6/2012 | Smith |
| 8,744,934 | B1 * | 6/2014 | McCrea ................. G06Q 10/06 705/34 |
| 8,838,486 | B2 | 9/2014 | Kong |
| 9,020,845 | B2 | 4/2015 | Marlowe |
| 9,020,848 | B1 | 4/2015 | Ridge |
| 2001/0042032 | A1 | 11/2001 | Crawshaw |
| 2002/0087366 | A1 * | 7/2002 | Collier .................. G06Q 10/02 705/5 |
| 2002/0138376 | A1 * | 9/2002 | Hinkle .................. G06Q 40/03 705/30 |
| 2002/0184121 | A1 * | 12/2002 | Sijacic .................. G06Q 10/10 705/30 |
| 2003/0120538 | A1 | 6/2003 | Boerke |
| 2003/0144969 | A1 * | 7/2003 | Coyne ................... G06Q 10/10 705/400 |
| 2003/0154122 | A1 | 8/2003 | Jackson |
| 2004/0215551 | A1 * | 10/2004 | Eder ..................... G06Q 40/025 705/38 |
| 2006/0184586 | A1 * | 8/2006 | Grear ...................... H04L 12/66 |
| 2006/0294003 | A1 * | 12/2006 | Snyder .................. G06Q 40/12 705/38 |
| 2007/0094110 | A1 | 4/2007 | McCrea |
| 2007/0118446 | A1 * | 5/2007 | Soehngen .............. G06Q 30/04 705/34 |
| 2008/0015982 | A1 * | 1/2008 | Sokolic .................. G06Q 20/10 705/39 |
| 2008/0021835 | A1 * | 1/2008 | Ginter .................. H04N 21/435 705/51 |
| 2008/0033851 | A1 * | 2/2008 | Williams ............... G06Q 30/04 705/34 |
| 2008/0120129 | A1 * | 5/2008 | Seubert ................ G06Q 40/125 705/305 |
| 2009/0006228 | A1 | 1/2009 | Hodgin |
| 2009/0307114 | A1 * | 12/2009 | Hahn-Carlson ........ G06Q 40/00 705/30 |
| 2011/0054968 | A1 | 3/2011 | Galaviz |
| 2012/0173297 | A1 | 7/2012 | Styn |
| 2012/0233044 | A1 | 9/2012 | Burger |
| 2012/0278211 | A1 | 11/2012 | Loveland |
| 2013/0086062 | A1 | 4/2013 | Coyne |
| 2013/0090968 | A1 | 4/2013 | Borza |
| 2013/0290154 | A1 | 10/2013 | Cherry |
| 2014/0095539 | A1 | 4/2014 | Smit |
| 2014/0108644 | A1 | 4/2014 | Zaents |
| 2014/0201138 | A1 | 7/2014 | Dorman |
| 2014/0258057 | A1 | 9/2014 | Chen |
| 2014/0310137 | A1 * | 10/2014 | Carter .................. G06Q 10/063 705/30 |
| 2014/0344122 | A1 | 11/2014 | Hodgin |
| 2014/0366104 | A1 | 12/2014 | Nishida |
| 2015/0081381 | A1 | 3/2015 | Okoba |
| 2015/0081487 | A1 | 3/2015 | Porter |

FOREIGN PATENT DOCUMENTS

| | | |
|---|---|---|
| EP | 1145162 A2 | 10/2001 |
| EP | 1769452 A2 | 4/2007 |
| EP | 2026222 A1 | 2/2009 |
| EP | 2338293 A2 | 6/2011 |
| WO | 2008061146 A2 | 5/2008 |
| WO | 2010011652 A1 | 1/2010 |
| WO | 2014016796 A1 | 1/2014 |
| WO | 2015029073 A2 | 3/2015 |
| WO | 2015079776 A1 | 6/2015 |

OTHER PUBLICATIONS

An Examination report No. 1 in the corresponding Australian Patent Application No. 2015305272, dated May 12, 2020.

A Search Report in the corresponding Brazilian Patent Application No. BR112017003557-0, dated Mar. 7, 2020.

A First Office Action in the corresponding Chinese Patent Application No. 201580057192.2, dated Mar. 31, 2020.

A Second Office Action in the corresponding Chinese Patent Application No. 201580057192.2, dated Feb. 19, 2021.

A Decision of Rejection in the corresponding Chinese Patent Application No. 201580057192.2, dated Nov. 3, 2021.

A Preliminary Report in the corresponding International Patent Application No. PCT/US2015/046429, dated Feb. 21, 2017.

An Extended European Search Report in the corresponding European Patent Application No. 15833888.9, dated Dec. 1, 2017.

An Office Action in the corresponding European Patent Application No. 15833888.9, dated May 8, 2019.

* cited by examiner

SYSTEM AND METHOD FOR INTER-FIRM, INTER-OFFICE, INTER-COMPANY BILLING AND FINANCIAL PROCESSING AND TRANSFER POSTING

CROSS-REFERENCE TO RELATED APPLICATION

The instant application is a continuation of co-pending U.S. patent application Ser. No. 14/833,032 filed Aug. 21, 2015 and entitled "System and Method for Inter-firm, Inter-office, Inter-company Billing and Financial Processing and Transfer Posting," which prior application claims priority to U.S. Provisional Application No. 62/070,882 filed Aug. 21, 2014 and entitled "Inter-Firm, Company, and Office Billing & Financial Processing & Transfer Posting," the teachings of which are incorporated herein by this reference.

FIELD

The exemplary and non-limiting embodiments of this invention relate generally to the field of timekeeping, financial processing, transfer posting and billing systems used in firms, companies, and associations consisting of multiple offices or legal entities.

BACKGROUND

In the current marketplace, there are computerized time and billing systems for professional firms which are marketed under the following Trademarks: Elite, BillQuick, and others. Some of these systems are computer based while others operate primarily in a cloud computing environment. These systems, however, are not suited to large professional firms and business associations having a global presence, with multiple offices in a plurality of countries which must be linked together for proper billing and financial management. In addition, these are basic programs which do not contain the most up to date features such as transmissions by text, email, fax, computer voice calling, near field communication and social media announcements and billing. Other numerous and varied disclosures related to billing and timekeeping are also disclosed in the prior art as shown below.

EP 1,145,162 issued to Ashby discloses the use of a System for processing credit applications, financial and insurance services and administrative and management tools. The System will generate a price quote for insurance and finance and facilitate on line credit application processing. It will further provide detailed reports for finance, insurance inventory, tracking and other administrative matters. It will provide quick quotes for a lease or loan. It will also perform: inventory tracking, insurance tracking, purchase tracking, applicant profiling, targeted marketing, customer satisfaction, etc. The system will collect data for credit, a description of the item being sold, insurance will be offered for the item, licensing and data required for the government will be collected.

Ashby also discloses that the User can be a financial institution, a dealer, manufacturer, insurer or supplier. It can utilize and store credit agreements with customer ratings and interest rates which can be bundled and sold on a public exchange. FAQ's can be provided in the system, and it can provide Quick Quotes on the spot to the consumer. However, this disclosure is directed to car sales and insurance, not timekeeping. The terms it stores are contract terms, contract ID, customer ID, buy rate, the sales rate, dealer markup, payments, cash down, trade in value, lease fee, monthly payments, commission and taxes due. However, Ashby does not relate to professional timekeeping or billing.

EP Patent No. 1,769,452 issued to Allin discloses the use of a computerized system for residential and commercial construction projects to maintain and disburse construction draws during construction. It can track lien waivers, and can prepare, approve, sign and distribute hundreds of checks to subcontractors each month. It also tracks construction change orders. It can manage all of the persons involved in each draw. It manages and generates a construction budget and time line. It also manages payments to material suppliers. It can manage and store the inspection data for each project. It can manage budgets for GC's as well as the subs. It handles ACH payments. Template forms are utilized to facilitate the draw process. Notices can be sent by email, text or voice.

EP Patent No. 2,026,222 issued to Alquier discloses the use of a system and method which allows the addition, modification and deletion of data base fields dynamically without the use of a data base administrator. The system allows the addition and modification of an informational structure dynamically distributed directly via the user interface. It supports different types of entity attributes including, text, numerical information, date and time, predefined values and binary objects, allows the creation of relational dependencies between information entities (e.g., patent/child), provides flexible reporting capabilities including spreadsheets, slides, documents, timelines, etc.; it allows a configurable data entry interface; it allows importation of data from external sources; it allows full text searches; logs modifications for an audit trial (important for pharma and med devices); includes email notifications. It allows for a user interface that is flexible and configurable. The system uses template items, coding and tables to accomplish these purposes. However, it is not directed toward time tracking and billing generation.

U.S. Patent Disclosure No. 2003/0120538 filed by Boerke, et al. discloses the use of a method for tracking progress on a task by dividing the period of time into a plurality of timeslots and determining a target number of subtasks to be completed during each timeslot. For example, the time slots may be divided into 15 minute increments. The system only tracks the number of subtasks completed for each timeslot. The method also keeps track statistically of variances in subtasks completed between workers. The task may include any type of work. The process may be used for planning purposes, i.e., as a planning tool such that management can plan and process daily or monthly work shifts according to the work to be done for particular tasks and subtasks. This helps a supervisor spot and correct negative variances in worker performance. The progress can be logged into a computer or worksheet or in paper format. Problems are also noted by the method for correction to improve performance by variance cards.

U.S. Patent Disclosure No. 2013/00090968 filed by Borza, discloses the use of an employee management and scheduling method which is directed to ensure that adequate personnel are present as required and that statutory requirements are met and costs are tracked and minimized. The Borza disclosure is also directed at apps for management cell phone usage wherein managers can track employees, their shifts and their skills and managing same. This allows for real time changes by employees that are sick or have not shown up for work. The locations may also be tracked. Scheduling software is used to manage multiple employees at multiple locations. From one screen, a manager may create, edit and delete shifts and also have access to other aspects of managing the organization staffing with information about positions, teams, skills, etc. being provided. The System can print Shift Assignment Reports and Employee Reports. However, this disclosure is directed toward scheduling employees and not tracking their time or billing for their time.

U.S. Patent Disclosure No. 2012/0233044 filed by Burger, et al., discloses the use of a Method and System for labor project management and costing which may run on a cell phone app to monitor employee activity, identify faulty activity and manage allocation of labor resources. The app, as installed on an employee cellphone, allows the employee to travel to various job locations and record the activities at each job location. The employee may log into or out of the timeclock app installed on the employee's cellphone. The system can be used to monitor managers and administrators as well as employees. The system can be used to transmit payroll information. A flag may be generated if the worker travels outside the permissible areas allocated to his role. The system stores employee photos, job locations, routes, job codes, SIC codes, etc. may be entered into the back end by an administrator. The system also generates reports, and has a "Dashboard" or summary report simply show who is on the job, what time they arrived and GPS confirmation of location. The LPM platform may also be operated in the Cloud.

U.S. Patent Disclosure No. 2014/0258057 filed by Chen discloses the use of a system and method for tracking the User's time of a mobile device for the purpose of billing clients. The system is provided with a digital timer which is launched at the time of arrival and then stopped when the employee leaves. The system is directed at tracking time on a mobile device or app. It tracks time sending texts and emails. Time is recorded as soon as the professional receives a voice mail, phone call, text or email. The user can also input notes with the system's time recording and entry. The app automatically looks up in the user's contacts list whether the call or email or text coming in is from a client, and if so, it begins to track it for billing purposes. If not in the contacts registry, the user is alerted at the time and can add the contact as a client to be billed.

U.S. Patent Disclosure No. 2013/0290154 filed by Cherry, et al. discloses the use of the system and method to manage employees at a plurality of jobsites by providing a database wherein a set of job site data is stored therein. Employee devices may collect a set of time punch data and photos to store in the system. Management apps are used on supervisory devices to monitor the job site data and employees and validate photos and activate employee apps. This system is shown operating on a Cloud environment. The app will operate with a web browser, Wi-Fi or on GPS authentication. The system essentially operates as a time tracking system for job sites. The system stores time photos of the employees at check in and check out. The system also records a job number, a job phase and a cost code. The system also has a payroll calculator communicating with a payroll service.

U.S. Patent Disclosure No. 2001/0042032 filed by Chrawshaw discloses the use of a system for capturing, processing and reporting time and expense data which can include flat fee billing, maximum fee billing and will also allow for discounts and write offs. It can be used for a wide range of businesses. A client will not have access to internal data of the company. The system will produce bills, expense reports, time sheets, proposals and project tracking. This appears to be a conventional program for law firm data which is run on a local server for one location. The system may produce various reports as needed. Bills may be delivered by email. The program will create envelopes for the bills. The system will also create budgets for the client.

U.S. Pat. No. 6,038,547 issued to Casto discloses the use of a construction tracking and payment system for use by contractors and subcontractors so that work may be tracked and payment may be timely made after the work is completed and inspections performed. The system complies with AIA requirements. The system may be implemented on a handheld computer. The system will break down a construction job into various elements, and then a contractor or subcontractor will be given a copy of how the site is partitioned, then each contractor or sub is responsible for submitting applications using the partitioning to ensure uniformity the architect desires to impose. The system can import and use CAD information on the job site. The system uses coding approved by the AIA.

U.S. Pat. No. 6,747,679 issued to Finch, I I, et al. discloses the use of a time keeping and expense tracking server including a server that implements computer instructions that define logic for building GUI screens according to user instructions. The user can implement and design the screens needed for the tasks of time keeping and expense tracking. The system may be implemented on the Cloud or Internet with a laptop or wireless device desired. The GUI screen may be customized on a company by company basis, a department by department basis, etc. The system also includes security wherein projects and project codes are only viewable by certain level employees.

U.S. Pat. No. 7,343,316 issued to Goto, et al. discloses the use of a network based shift scheduling system for generating temporary shift workers. It is sent over portable terminals over a network. The system is set to secure and provide work for a plurality of workers. Workers can also submit cancellations or shift changes via the system. The system also accommodates email for communication purposes. The system may also recruit new employees. The system stores the name, age, sex address, mail address and qualifications of the employee, the workable time slots, the type of job, hourly wage, etc.

WPO 2014/016796 filed by Gupta, et al. discloses the use of a system and method for employee tracking in a mobile communication device wherein dynamic location reports may be generated in real time or near real time. The system is directed to door to door delivery or pickup sales forces. The System uses a mobile app on the employees cellphone to conduct the tracking of the employee. The system will raise flags if deviations from tracking occur. The system uses Blue Dophil software to analyze where employees should be performing tasks and produces flags when parameters gathered fall outside permissible ranges. These flags are sent to management via text or email.

U.S. Pat. No. 6,832,176 issued to Hartigan, et al. discloses the use of a method and system for tracking and reporting time spent on tasks in different application on the end users' computers while the tasks are being performed. It may track the opening and closing of files automatically and send reports and messages directly to and from other applications. The software may also suggest categories for each task based upon at least one criteria. The system may use MS Outlook for assistance in tracking tasks and transmitting reports. It is directed toward attorneys and accountants. The system may track fixed fees and use data collected for evaluating production or sweat equity bonuses to employees. The system may track a plurality of projects or research endeavors. It can track the time spent by accountants on spreadsheets. It can track the time engineers spend on designing computer code or simulating circuit designs, etc. It mentions the use of Timeslips for professional time tracking and TABS II for tracking other professional time spent on tasks and projects. The system tracks time on computers used by the professionals involved. The system presents toolbars to assist in tracking time. The system will track time spent in applications such as MS Word, Excel, Outlook, Power Point, etc. It will track when the application is open, active and then closed. It can score and rate the usage of these various types of software automatically. Various reports may be generated by the system for management usage on a periodic basis, as desired.

WPO Patent Disclosure No. 2015/079776 to Hishiki discloses the use of a work state management system that manages clock in times for drivers of vehicles that work overnight shifts and calculates the appropriate breaks for the driver so that the driver is not over tired.

U.S. Patent Disclosure No. 2014/0344,122 filed by Hodgin, discloses the use for billing for time spent in an IM session by a service person wherein the system can automatically bill a project/client by searching for the name of the client or project within a text or instant message or a series or session of same. If the system cannot find the name of a client or project, then the user will associate the IM session with a new project or client so that the client may be billed for the IM session with the client. Or the System may default into a common template for the User's typical instant messaging sessions.

U.S. Patent Disclosure No. 2009/0006228 filed by Hodgin discloses the use of a time tracking system and method similar to the IM system noted above by Hodgin. The Hodgin system will also store a list of prior associations to Projects and Clients that are built on the same or similar words and phrases.

U.S. Patent Disclosure No. 2002/0154122 filed by Jackson, Jr. discloses the use of an improved system for employers, referral agencies, consultants and independent contractors to hire and manage employees and provide tax reports and wage reports. The Jackson, Jr. System may track and manage employees, salaries and experience to provide optimal benefits to the employer. The System produces computerized scheduling, billing, record keeping and payment templates. It provides a listing of invoices for the User to refer to. It consists of providing invoices for contractor services and performs its functions in a cloud based system.

U.S. Pat. No. 8,838,486 issued to Kong, et al., discloses the use of a time manager interface on a communications display device which allows a worker to keep track of her or his time and activities. The time manager keeps track of time spent logging into and out of the system. This was important in years past when boot time were quite long. It discloses the use of scanning in employee badges to track work time. This disclosure is directed toward a system for checking work in and work out time. In one version of an embodiment, the System is located in the field. It discloses the use of GPS in the field to create an audit trail of time worked. Biometric information may be used for the system to identify the worker. It can be used nationwide for multiple local offices. It may be coupled to communicate with employee handheld devices. It can work over Wi-Fi and cellular networks. It can store: DOB, SSN and other employee details. It can be used with a barcode or QR code. It can be used in connection with microphones, cameras and scanners. For remote sites, the system can check the IP address of the computer or handheld device to ensure security in the system. The system can also be used to check work schedules to lock an employee out of the system when not scheduled. When an employee arrives at a worksite, upon verification, one or more emails or text messages may be sent to management for that site. Employees may view the work schedules of other employees if granted permission to do so. In doing so, employees can request work dates and exchange them with others. The system can differentiate between exempt and nonexempt employees. The system can display messages to employees during time in and time out registration.

U.S. Patent Disclosure No. 2012/0278211 filed by Loveland discloses a system for remotely tracking and monitoring Worker's activities via mobile phones or other mobile tracking devices. This system monitors continuously whether or not a worker is present at a worksite.

WPO 2010/11652 filed by Manser discloses a System and Method for tracking employee performance. The Manser system provides a user interface to allow the user to assess the balance of hard skills and soft skills of an employee, evaluate the employee's performance in a plurality of categories and compare the average cost for the job in the marketplace to the cost of the employee being evaluated. The system also analyzes the average cost of a similar job in the relevant marketplace during employee reviews. The program continually monitors the value of an employee to the employer to determine ROI at any given time. The system can be applied to direct hires, contractors, temps or any employee relationship. The system allows the identification of both over achievers and under achievers. The system provides a means by which employees may determine how to get the highest ratings via their work efforts.

EP 2338293 filed by Molotsi discloses a system for time tracking for employers on a mobile computing device. The system involves providing an event manager on a mobile computing device for managing a plurality of events which are then synchronized to a server. The system will automatically track time and estimate time spent on a task by the worker. This system logs events in the user's calendar, in emails and texts. Timestamps for events and mapping for the events are provided. A client list and data may be provided in one or more files or databases. The system may communicate with a worker's smartphone. The user may be able to open, edit, delete, review or manage all automatically created event records. The system may use information in the text, email, and calendar to automatically create a time tracking record for the user. In addition, the system may automatically convert emails, texts, meetings on a calendar to a time tracking event by means of a pop up box to the user.

WPO 2008/061146 filed by Neveu Holdings, LLC discloses a system and method for remote time collection for employee time on job sites. The system can collect an employee's name, picture, title, contact information, health and/or safety information, skill information, etc. The system can also collect for each employee a project name, project identification, location, project start date, project supervisor and detailed comments about project activity. The system can also collect information on vendors, such as name, address, phone, contacts and type of vendor. The system can also use GPS information and compare it with when the employee is supposed to work. The system collects biometric information to identify an employee. In one embodiment, a time collection database is configured to receive, process and store information related to projects such as name, identification, location start date, supervisor, etc.; vendor's name, address, number contact, subcontractor type, etc. project supervisors, tasks, employee titles, departments and employee time records. Office data collection may include: job site, task and project information via a wireless connection. Encryption is used to transmit data to and from the remote site. The system may also include a field scheduling module to schedule a job for a particular jobsite and for a specific remote user(s). The user can edit hours and view comments from remote workers. Remote monitoring can record task completion, view management comments and ask for management assistance and crew responsibilities.

U.S. Patent Disclosure No. 2015/0081381 filed by Okoba discloses a system and method for recording time which may be used on a device, software or application. It may be used by logging into a plugin or extension. The time recorded may be exchanged for vouchers which may be redeemed or traded with other members. A user will register with an ID and password to log into the system. The system may record device activity, software activity, application activity, keyboard activity and mouse activity. The user's time spent in the browser or on a video game may be given a redeemable value. A database may store the recorded activity for further analysis. The system will work on computers, tablets, cell phones, television, games, digital books, exercise apparatus, web browsers, mobile apps and video games. Vouchers may represent monetary value, promotions, products or services. User name and password may be stored in system cookies. The system can capture video game or browser activities, keyboard or mobile keyboard activities. The activity spent in the system may translate to purchasing power so that the user may receive optimized value from their activities and the system may deliver purchasing incentives at the right time and place and for the right product or service. A business may be selected as a favorite from user activity on the system.

U.S. Patent Disclosure No. 2015/0081487 filed by Porter, et al., discloses the use of a time tracking and productivity system including a tracking component to locate an employee to record time spent at various locations. This system is designed to monitor and improve coordination of patient care, and in particular, to limit the number of patient hours a resident physician can work per week. When the rules implemented by the ACGME are violated, strict fines and probations or suspension may be implemented. This system is primarily concerned with tracking an employee's location and work hours. This system can include cloud performance. It is the movement of an employee within predetermined boundaries that will trigger the recording of a new event. It can track time in a patient's room, a brake area, doing paperwork, etc. A GUI is used on handheld devices. The system can also use tags that interact with RF signals. The system records employee info and FRIDA numbers, the resident program director, the resident coordinator, start and end times for resident shifts, house calls, hospital room calls, night float, etc. If moonlighting is permitted, the system can track moonlighting hours as well. It will store vacation schedules and rotation schedules. The shift log can include a short trip buffer. Automatic warnings of over limit hours are sent to management for the residents via text, phone, email, etc.

U.S. Pat. No. 6,185,514 issued to Skinner discloses a method and system for automatically collecting and analyzing information regarding time and work performed on a computer. It uses a data collector for monitoring certain portions of a worker's computer activity and an analyzer for showing which portions of the activity were continuous work activities, and the system will categorize the work into preset projects and tasks within a project. The information is periodically written to data storage. The system is directed toward telecommuters. The system automatically excludes time where there was no activity on a computer. The system is used to forecast future projects with reduced financial risk. The system includes the automatic documentation of time. The data stored on the system is encrypted so that it cannot be altered by the user. The data collector automatically collects the activity on a mouse and on the keyboard of the computer user. The system creates a log file of work activity. A hardware abstraction layer can interface with phones and other devices and can be used with pointing devices such as a tabled or mouse. The system keeps track of activities within open multiple windows on a computer.

U.S. Pat. No. 8,209,243 issued to Smith, et al., discloses the use of a system for performing real time labor management and timesheet reporting which is adapted to wirelessly transmit timesheet information. The portable devices may be dedicated to tracking time only and cannot perform other computing functions. The system includes a portable electronic punch system that is capable of communicating with the labor management system via text. The system allows user to manage work schedules and report timesheet information without requiring an internet accessible computer. The units send timesheet information directly back to the server for analysis via wireless network. The text messages may contain: employee ID, clock in time, clock out time, break times, days worked, days off and other work related information. New user information may be set up by text message into the timekeeping system. The system may operate over any wireless system, i.e., GSM, GPRS, CDCP, Bluetooth, Wi-Fi, etc.

U.S. Pat. No. 9,020,848 issued to Ridge, et al., discloses the use of a method for tracking time and location of an employee according to a predefined schedule and it may utilize software to track the presence or non presence of: a NFC (near field communication), BLE (Bluetooth Low Energy) or other wireless device. The system will track the presence of an employee in a geofenced area. It will also track employee time and other data to log that into a payroll system. The low energy device then communicates data to a server if a signal could or could not be detected. It will also allow for manual clocking in and out in case of failure of the back end server. The system can also be used for security purposes. The system can function in real time or in batch request mode. The information may be a time stamp, a status or location of a mobile device. In one embodiment, the system can be used for employees for a retail store or restaurant. The system can utilize Bluetooth tapping to log in. It may be used at a trade fair both by tapping the device to a NFC communicator. It may be used in connection with a mobile time clock app. It can be used to advise management when non authorized employees enter a restricted work zone. Management may input which work zones are restricted and which are not.

WPO Disclosure 2015/029073 file by Shirish discloses a system and method to measure aggregate and analyze time, effort and productivity by reviewing time spent on activities such as calls, travel, lab work, meetings, discussions and remote visits. PD's or Presence Devices may be used to track employee location. The system can track average daily work patterns. It can track work activities and private activities. It can track emails and browsing. It can account for flexible work hours, use of multiple and different types of computing environments (PC at work and home, smartphones, tablets, etc.) It can capture files, folders, web links, etc. It can make all personal endeavors password protected and private. It is intended to track effort and performance 24/7. It can provide modules that promote work focus and minimize distraction by awarding performance points, badges for consistent performance and progress in performance goals. It can measure improvement by creating an n-dimensional effort data cube and include analytics for custom reports. The system can go into self-improvement mode to set goals for self-improvement and activities related thereto. It can be used at work whenever and wherever. It has a time tracker for all online time. It has a Merger to merge offline and online time effort mapping. It has an interference engine to determine Work Patterns for employees, leave taken, work done on holidays, desk or supervisory or travel oriented job, etc. The System will also present organization goals and analytics, top performers, work patterns, recent deviations from work patterns. A Collector module measures data to improve the exact work effort at the individual level throughout the day. The System can be used on SAS (Software as a Service) and it may be hosted in a cloud-computing environment.

U.S. Pat. No. 2012/0173297 A1 disclosed by Styn, et al., a method and system for task tracking and allocation is disclosed. The disclosure provides for a method in which an individual may create a set of instructions operable to perform a set of tasks in a computer readable medium. That set of tasks may comprise maintaining a database, generating a first interface displaying subjects associated with individual issues, and a second interface with notes specific to an issue selected by a user. The instructions stored in the database may be implemented accordingly and the computer may maintain a plurality of relationship records containing data indicating relationships across folders. The disclosure also mentions the prior use of MS Project and ERP systems that employ Gantt charts, milestones and tasks and subtasks with complex dependencies. This system keeps track of billable items. However, Van Styn is not a true timekeeping and professional billing system.

U.S. Pat. No. 2014/0108644 A1 disclosed by Zaents, et al., a method and system for tracking time in a web-based environment is disclosed. The method of tracking time involves a web-based application to track time associated with several records. Identifying a record in an active state, generating a record associated with the active record and activating a timer, and having the ability to end the session in response to an indication that the record is an inactive state. The time-tracker may be hosted in a cloud-computing environment. The time-tracker may calculate the entire duration of the record by continuously adding the active times together. The method may detect a predetermined total duration of time has been exceeded and provide such indication to user. This disclosure mentions timekeeping, billing and using a web browser and multiple tabs to record time for multiple clients when a professional is switching back and forth between projects. It is useful for billing, accounting and auditing. More than one user can log into the system on a computer and track time her or his time on the same computer. It also teaches the use of sub-tabs to track time. A stopwatch type button is used to switch on and off the time tracking, or time is tracked as the user switches browser windows.

In US 20140201138 A1 is disclosed a system and method regarding the functionalities, features, and user interface of a synchronization client to a cloud-based environment. The disclosure describes a method to keep different versions of documents synchronized between the local device and the cloud-computing environment. Embodiments of the prior art include systems and methods for a synchronization client that is connected with a collaboration environment including a cloud-based environment and runs on a client device such as an iPad.

In reviewing the prior art, there is disclosed in US 2013008062A1, a method and system for the management of professional services project information. Disclosed in the prior art is a method for improving the accessibility and transferability of various data or information resources used in the management of a business. In one embodiment of the prior art, is a computer network for managing a business, consisting of a computer network, CPU and processor and one or more distributed application means, data cooperating with said one or more distributed applications means, and data storage means, and project management database means cooperating with one or more distributed application means for facilitating the transfer of said data from said one or more distributed application means.

Further, U.S. Pat. No. 20110054968 A1, Galaviz discloses a system for continuous performance improvement. The prior art discloses a management approach to employee productivity and quality assurance to clients. In one embodiment of the prior art is a computer-implemented method for continuous performance improvement, the method includes providing visibility of project documentation and allows for collaboration and version control for the project documentation, this is done over a web-based workspace.

Similarly, in U.S. Pat. No. 20140095539 A1, Smit et al. discloses, a system and method for asynchronous client server session communication. The prior art provides a system that offers a highly effective solution to the aforementioned disadvantages of both client-server and Internet systems by providing a way to synchronize the data entered on a client system with the data on a server. Data input by the client are transferred to the server, and the server updates the client display. A plurality of servers can be used to serve a number of static or dynamic sources. Data can also be presented to a client without user input, meaning the data are automatically pushed to the client. This enables a client component to display the data immediately, or to transmit the data to another program to be handled as required.

In the prior art, the systems and methods used for inter-office billing consisted of a cumbersome, complicated method, involving many resources and multiple departments and much room for human error. When an office would seek to bill another office for work timekeepers in multiple offices or legal entities completed, each timekeeper working on the project or matter would submit their timecards to the billing partner or manager in the billing office. The billing partner or manager would then adjust the timecards as he or she saw fit, and then bill the client. The billing office would then collect the funds from the client. Said funds would appear on the billing offices post as revenue, despite a portion of the funds not belonging to that office, because timekeepers in other legal entities billed for that time. Afterwards an intercompany group or the like would collect timecards from the offices involved pertaining to each timekeeper involved in the project or matter and calculate disbursements. The present inventive system and method streamlines the aforementioned process into a simple and easy to use and immediate process. The present system eliminates the need for intercompany group to process each individuals timecards and provides a system that can automatically provide said calculations and disbursements across numerous offices with accurate postings to each account of profits and losses to reflect the breakdown.

Thus, nowhere in the prior art is seen a billing or financial system which can provide an improved and expedient means to transfer and settle transactions that cross multiple different Legal Entities on the Firm ledger and Statutory ledger of the sending legal entity (sle) and receiving legal entity (rle), and is triggered by Cash events or Non-Cash events.

SUMMARY

The present invention comprises an improved system and method for interoffice, inter-firm, inter-business association invoicing, billing, transfer processing and posting. In the present invention, Improved System and Method for Inter-firm Billing and Posting, the system is able to raise invoices for work or time entered into the system between different offices, legal entities so contractually bound, member firms or other business associations.

In one preferred embodiment of the present inventive system and method, an International B.V., and its Member Firms are members of a Swiss Verein. Except for a few direct Billing arrangements, Member Firms have no legal relationship with each other, but have entered into agreements with International B.V for the sale and purchase of Legal Services and other activities, such as loans and shared expenses, carried out for the mutual benefit of all Member Firms. The B.V. handles all the Inter-country Billings between the Member Firms. The Inter-firm Billing process is necessary to manage the agreements between the Member Firms and the B.V., and thereby substantiate the structure and arms-length relationship between the Member Firms and the B.V. This process is a vehicle for transferring cash between Member Firms and generates the necessary documentation for Statutory Reporting.

The transfer and settlement of transactions comprises two processes: 1. Transfer Processing and 2. Inter-firm Billing. Transfer Processing is the posting of transactions that cross different Legal Entities on the Management (Firm) Ledger and the Statutory Ledger of the Sending Legal Entity (SLE) and Receiving Legal Entity (RLE), and is triggered by Cash events, such as Collections of Client Fees by the Billing Office on behalf of a Working Office, or Payment of Expenses by an Office (Sending Legal Entity) on behalf of another Office (Receiving Legal Entity). Transfer Processing can also be triggered by Non-Cash events, such as a recording of Client Costs by the Working Office to a Billing Office Matter or Write-off/Write-down of Client Costs by the Billing Office on behalf of a Working Office. There are several different types of Transfer transactions, referred to as Bill Types. The major Bill Types are:
1. Legal services (Client Fees)
2. Legal Costs (Client Costs)—billed with legal services (Client Fees)
3. Cost/Balance Sheet Transfers
4. Locally incurred Global/Regional Costs
5. Service Fees/Cost Pooling
6. Firm Management Compensation (annually)
7. Interest (annually)
8. Year-end True Ups (annually)
9. Direct Billing of Legal Services/Costs
10. Misdirected Client Payments Inter-firm Billing is the process of Billing Transfer Transactions between two parties, based on contractual agreements between those parties. Generally, the B.V. is an intermediary between two Legal Entities. The Sending Legal Entity bills the B.V. for the Transfer Transactions and the B.V. in turn bills the Receiving Legal Entity.

The B.V. also makes Loans and borrows (Inter-firm Loans) from Member Firms for shortage/excess Cash and tracks them. The B.V. also receives and tracks Loans of Capital on behalf of Principals. The Inter-firm loan activity is non-billable so is not billed to/from the B.V.

In one preferred embodiment of the present inventive system, each timekeeper may enter time while denoting the local office (where he or she is employed) code, as well as the billing office (where the matter or project is located) code, as well as time worked, expenses incurred, and other relevant details all in one place at one time. After the time entries are input into the system and a billing partner or other manager has the option to approve time or alter based on discretion, the billing partner of the billing office, handling the account with the clients, will then bill the clients. When the clients then pay their invoice, the funds will be collected and posted to the billing office account. However, because there are costs associated with the matter or project, the postings automatically adjust to account for the costs associated with the matter (which are also entered by timekeepers), further the postings also accounts for the funds that will dispersed to other entities for their time or work, whilst adjusting for losses and profits, therefore providing an accurate reflection of each entities profits and losses. Whereas in the prior art the posting would not account for the monies that would be transferred to other entities in real time, and would show either an inflated or deflated profit and loss.

Furthermore, the system will transfer said funds to other entities as so required by contract, abiding by International Treaties, organizational structure, accounting for the local statutory requirements of each office and the varying taxes associated with the different localities, and being fully capable of being audited.

In one preferred embodiment of the present inventive system and method, some entities will desire to bill directly between two legal entities or offices, whereas some will need to transfer through several offices or entities, further yet, some may require the use of a third or fourth party or an intermediary or hub, such as a B.V. in the case of a swiss verein organization. This system is able to raise the invoices, transfer funds, as well update ledgers and postings immediately. For example, if a member office of a swiss verein in Korea had timekeepers working on an assignment in the US, alongside those in the US. When each timekeeper that worked on the assignment whether in the US or in Korea entered their time into the system, the manager of the billing office may approve said entries, and invoice the client. When the client paid, the system would process the payment, noting the timekeeper's entries and noting which offices each worked in based on the tagging and entry of office code with each time code; the system would note on the ledgers and profits and loss postings the payments needed to be deducted from the billing office postings for the timekeepers in the local office, accounting for differences in currency, accounting for adjustments made based on approval or changes made by the billing partner and for the offsetting of profits based on costs entered into the system as well.

In yet another preferred embodiment of the present inventive system, the two legal entities in the aforementioned embodiment: the office in Korea and the Office in the US worked on a project together, the US was the billing office and Korea the local office of some of the timekeepers, however, the offices do not want to bill directly between one another in respect of treaties or their contractual agreements. So, they use a third party hub between them. The system can process the invoices, transfers and postings as stated above, with the additional office in between. For example, the timekeepers in the Korean office enter their time, noting their office code and the project's billing office code, the system will be set to invoice the Korean timekeepers time to the third-party hub office, for example a B.V. The third party hub will then invoice the U.S. office, the U.S. office will then pay the B.V. and the B.V. will then pay the Korean office. This B.V. may serve as an interoffice financial office between global offices. It may process the payments at no fee or it may take a fee if a discount arrangement is set up within some of the offices. For example if the Chinese office entered into the Swiss Verein with a 20% discount agreement. The Chinese timekeepers would enter their time as explained above, the system would generate an invoice for the work the timekeepers conducted to the B.V., the system is set to note this discount arrangement, it can bill the Billing Office for those fees at full price. The Billing Office will pay the full price to the B.V. and the B.V. will pay the Chinese office 80% of its bill, to account for the 20% discount arrangement.

Further, if the Korean office in the example above, and the Chinese office, and four more global offices all worked on a matter for the UAE office, which is the billing office in this scenario. Each timekeeper would enter his or her time, as explained above and when the UAE office collected the fees from the client (after adjusting for billing manager discretion and costs), the system would automatically set up transfers to each legal entity based on their contractual agreements, instantly. For example, the US may require to be paid directly from the UAE, whereas the Korean office can only bill the UAE for anytime worked through the Chinese office and the Chinese office can only bill through the B.V. This means that the US system will raise an invoice to the UAE, and the payments will be transferred, accounting for varying currencies. These payments, costs and losses will all be posted instantly into each entity's ledgers. At the same time, the system will raise an invoice from the Korean entity to the Chinese entity for its time. The Chinese entity will raise an invoice for its timekeepers and for the Korean invoice to the B.V. and the B.V. will raise these invoices to the UAE. The UAE will pay the invoice to the B.V. and the B.V. will collect any monies based on any discount agreements and the B.V. will pay the Chinese entity. The Chinese entity will pay the Korean entity. The additional 4 entities will all be paid according to their contractual agreements, accounting for their currencies, international trade laws, tax codes and their ledgers will all update automatically by the system, immediately to comply with statutory reporting and provide accurate and auditable reporting.

In yet another preferred embodiment of the present inventive system, a legal entity may use this system and method to collect fees for incurred costs from other entities. For example, a legal entity of a multi-chapter non-profit organization related through contractual agreements, may host an expensive gala for its benefit along with the benefit of the other 7000+ chapters. The local entity that hosts the gala may then enter the details of their expenses associated with the gala into the system. The system will then automatically raise invoices to each of the entities, based on the parameters of their agreement with one another. Some may be directly or indirectly invoiced or, or all may be invoiced through third, fourth, fifth or any number of degrees as required by the entities.

Another unique aspect of the present inventive system is that the system and method account for the needs of each entity involved. This means accommodating frequency of invoices, statutory requirements, local tax codes that tax for different aspects of the bill, different statutory rules that require various backup documentation. In one preferred embodiment of the present inventive system, some entities require invoicing from other entities monthly, or daily, whereas others may require their invoicing only yearly. The system can collect the invoices and raise the invoices based on these set parameters or they can be manually raised at any point. Furthermore, the system allows for a one line invoice with a summary, along with keeping and providing all related backup documentation based on the statuary and reporting requirements of that entity. Nowhere in the prior art is there a system that may accommodate these needs.

In the aforementioned descriptions, specific details are set forth in order to provide a more thorough description of the present invention. It will be apparent, however, to one skilled in the art, that the present invention may be practiced without some of these specific details. In other instances, well-known features have not been described in detail so as not to obscure the invention. The descriptions include several examples of how the process would be implemented under certain circumstances.

The present invention may be implemented on any convention or on any general purpose computer system not limited to desk top computers, laptop computers, tablets, cell phones or smart watch. A keyboard and mouse can be used for introducing user input to the computer system and communicating that user input to CPU. The computer system may also include main memory, video memory, and mass storage may be shared on a network or it may be a dedicated mass storage. The computer system described above is for purposes of example only. The present invention may be implemented manually or in any type of computer system or programming or processing environment.

A method and apparatus for transfer postings and for inter-firm billing is described. The Inter-firm Billing and Transfer Postings is a novel process providing for the transfer and settlement of transaction, this has never been done before on ERP systems or on various other similar systems. Because this billing and posting process is primarily for use in professional firms, many of which manage their accounting and firm management on systems such as ERP or similar systems, this invention will allow for a streamlined and uniquely run billings and posting process.

Where "firm" alone or within the term "interfirm or inter-firm" is used, it is meant to include any company, non-profit, non-government organization, business association, swiss verein, corporation or other association.

Although the foregoing summary has set forth specific embodiments of the present invention, numerous other additions and substitutions may be found to be common in the prior art and obvious to try shall be included in the above summary as if set forth fully herein.

OBJECTS

Thus, it is one primary object of the present invention to provide for global transfer and settlement of transactions and postings of transactions in a streamlined process and system.

It is yet a further primary object of the present invention to provide for the raising of invoices, transferring and settling transactions directly between two entities or through an intermediary, or through a plurality of intermediaries.

Another primary object of the present invention to provide the raising of invoices at varying frequencies, dependent on the preference of the entity, or manually raising the invoices. One invoice may be held until desired interval for being raised, or even thousands of invoices may be aggregated, all supporting documentation kept, and one invoice raised at the desired interval.

It is yet a further primary object of the present invention to provide for one invoice or an accumulation of a plurality of invoices aggregated into one sum and brief, one-line invoice, whilst providing detailed reports and the documentation to accompany the invoice raised at the predetermined intervals. The documentation included includes any additional documents or breakdowns required for specific statutory or local accounting or reporting.

Still yet, a further primary object of the present invention to provide the raising of invoices for services fees or cost pooling offsetting balances accordingly based on incurred costs.

Another primary object of the present invention is to enhance the Firm's ability to manage and provide data, postings, and billings in a harmonized, consolidated fashion everywhere the Firm conducts business.

Still yet, another primary object of the present inventive system is to increase efficiency and profitability by reducing the local and global costs of maintaining disparate systems and processes, and to reduce quarterly and yearend financial support schedules, conduct global transactions that used to be posted by Global staff can now be posted by local personnel.

These and other objects and advantages of the present invention can be readily derived from the following detailed description of the drawings taken in conjunction with the accompanying drawings present herein and should be considered as within the overall scope of the invention.

DETAILED DESCRIPTION OF THE PRESENT EMBODIMENTS

Figure 1:
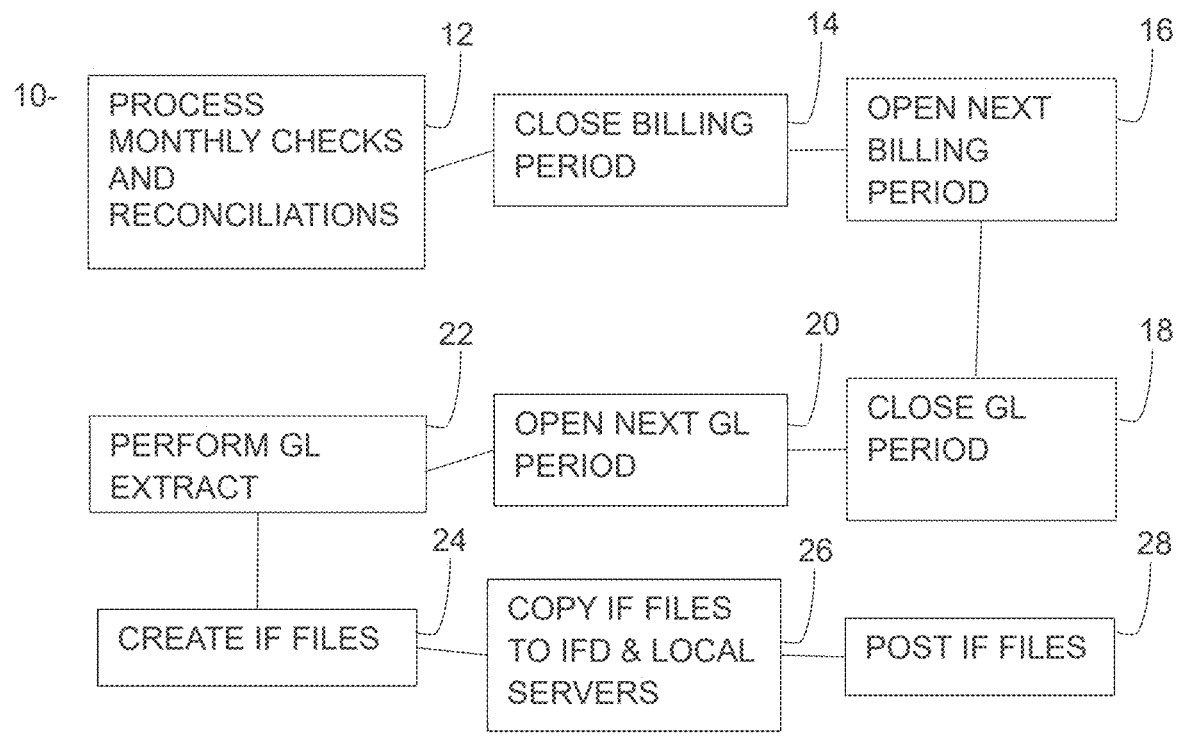
FIG. 1 is a Flow Chart of the present inventive system, Inter-firm Billing and Transfer Posting.

Shown now in FIG. 1 is a flow chart illustration of an embodiment of the present invention, Inter-firm Billing and Transfer Posting, which is demonstrates a process for the business method that is used in the Inter-firm, Inter-Company, and Inter-Office Billing & Financial Processing & Transfer Postings Financial Management Business Method 10. This flow chart depicts an example of how the process applies to inter-firm billing in a BV closing with Management Report Extraction. Some abbreviations used in this chart are GL: General Ledger, IFD: [International] Finance Department, and IF: Inter-firm.

This process begins with monthly checks and reconciliations being processed through ERP or other similar system by a Financial Analyst/Finance Team 12, or other similar type of role. All the following steps, in each of the process flows that are shown to be completed by ERP can be completed by other similar systems and all the roles identified can be completed by other individuals with different roles. The next step is the close billing period being processed by ERP by an analyst 14. The next step is when the next billing period is opened, this is processed in ERP by Analyst 16. Next, is the period to close the General Ledger (GL) this is processed through ERP by an Analyst 18. Then, the process comes to opening next GL period through ERP by an Analyst 20. Next, GL extraction is performed by Finance Team (or other) or Financial Analyst 22. Next, Inter-firm (IF) Files can be created by the Finance team through a System 24. Next, the IF files can be copied to IFD and Servers manually by an Analyst 26. Finally, IF files are posted through ERP by Finance Department Accountant (or other individual) 28.

Inter-firm Billing is the process of Billing Transfer Transactions between two parties, based on contractual agreements between those parties. Generally, the Bestoloten vennootschap in a Swiss Verein Incorporated or other type of Member Firm or Office Branch is an intermediary between two Legal Entities. To explain how this process works, we will give the example using a BV and Swiss Verein structure, however, this can be used in any type of incorporation or partnership type of organization. The Sending Legal Entity bills the B.V. for the Transfer Transactions and the B.V. in turn bills the Receiving Legal Entity. The B.V. also makes Loans and borrows (Inter-firm Loans) from Member Firms for shortage/excess Cash and tracks them. The B.V. also receives and tracks Loans of Capital on behalf of Principal. The Inter-firm loan activity is non-billable so is not billed to/from the B.V.

The Transfer Processing and Inter-firm Billing Processes have the ability to process Inter-firm and Billing with any of the following non-exclusive scenarios for RLE or SLE: SLE/RLE uses full Accrual accounting, SLE/RLE uses Statutory Cash accounting, SLE/RLE uses Modified Accrual accounting.

Figure 2:
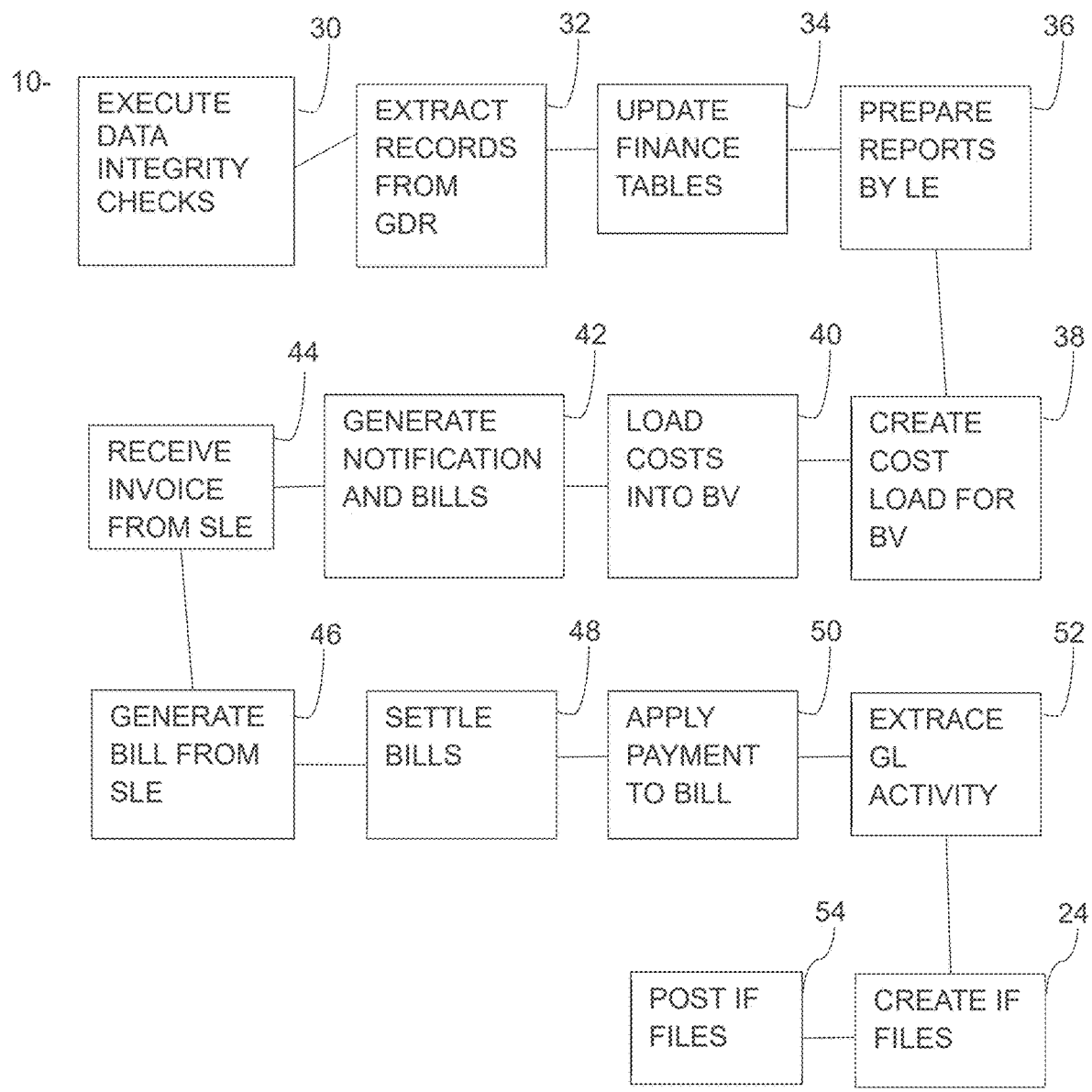
FIG. 2 is a Flow Chart of the present inventive system, Inter-firm Billing and Transfer Posting.

Shown now in FIG. 2 is a flowchart diagram of one preferred embodiment of the present invention. This embodiment demonstrates a Financial Management Inter-firm Billing for Professional Services Time and Cost, a process in the present invention, Improved System and Method for Inter-firm Billing and Posting 10. Some of the abbreviations noted in the process flow are: FD: Financial Department, GDR: Business Intelligence System, and B.V. Bestoloten vennootschap, which as previously noted is used as an example when explaining the process within Swiss Verein organization structure, however, the description is interchangeable for all other types of offices, corporate structures, and other professional organizational structures. The process applies to all types of professional organizational structures, and should not be viewed as limited to the Swiss Verein structure, as that is an example used to provide clarity in these process flows.

The process begins with an execution of data integrity checks by the business intelligence system by the Financial Budget Accountant 30, which can always be done by a different individual or employee. Next, records are extracted from the business intelligence system through the Finance Team by Analyst 32. Next, finance tables are updated through finance team by financial analyst 34. Next, reports by LE are prepared by finance team through system 36. Then, cost load for BV is created through finance team by system 38. Next, load costs into BV by the finance team through the financial analyst 40. Notifications and bills are then generated 42. Then, SLE invoice is received by local office by financial analyst 44. Next, ERP generates a Bill from SLE by Analyst 46. Then, ERP settles bills by Analyst 48. Next, payment is applied to the bill through ERP by Analyst 50. Then, GL activity is extracted by Finance team or financial analyst 52. Then, IF files are created through system by finance team 24. Finally, IF entries are posted through ERP by finance department 54.

Not shown, is an embodiment for process for inter-firm billing cost balance sheet transfers. The process begins with data integrity checks completed by the business intelligence system by the financial department. Next, the records are extracted from the business intelligence system through ERP by Analyst. Next the finance tables are updated through ERP. Next, LE reports are prepared through ERP. Next, cost load is created for the BV in ERP and costs are loaded by financial analyst. ERP then generates notifications and bills. The local office then receives invoice from SLE. Then ERP generates bill from SLE. ERP settles bill with treasury analyst. ERP applies payment to bill and then extracts GL activity. ERP then creates IF files and finally posts IF entries.

Further the process has the ability to process transfers with the following transfer Timing Options or Accounting Options. Timing Options control when Revenue or Expense is recognized in the Statutory Ledger.

Accounting Options control what accounts are used, and how they are used, in the Statutory Ledger. SLE Accounting Options recognize Transfer using the same postings as the Management Ledger. Recognizes profit and loses postings using multiple accounts for the initial Management Transfer then as Cost Recovery when the Statutory Transfer posts.

Recognize profits and losses postings using a single account for the initial Management Transfer then a Cost Recovery when the Statutory Transfer posts.

RLE Accounting Options—recognize original transfer to a Balance Sheet Account that is cleared when the Timing Option is executed.

Recognize original transfer to a P&L account (or accounts) that is cleared (or offset) when the Timing Option is executed.

Figure 3:
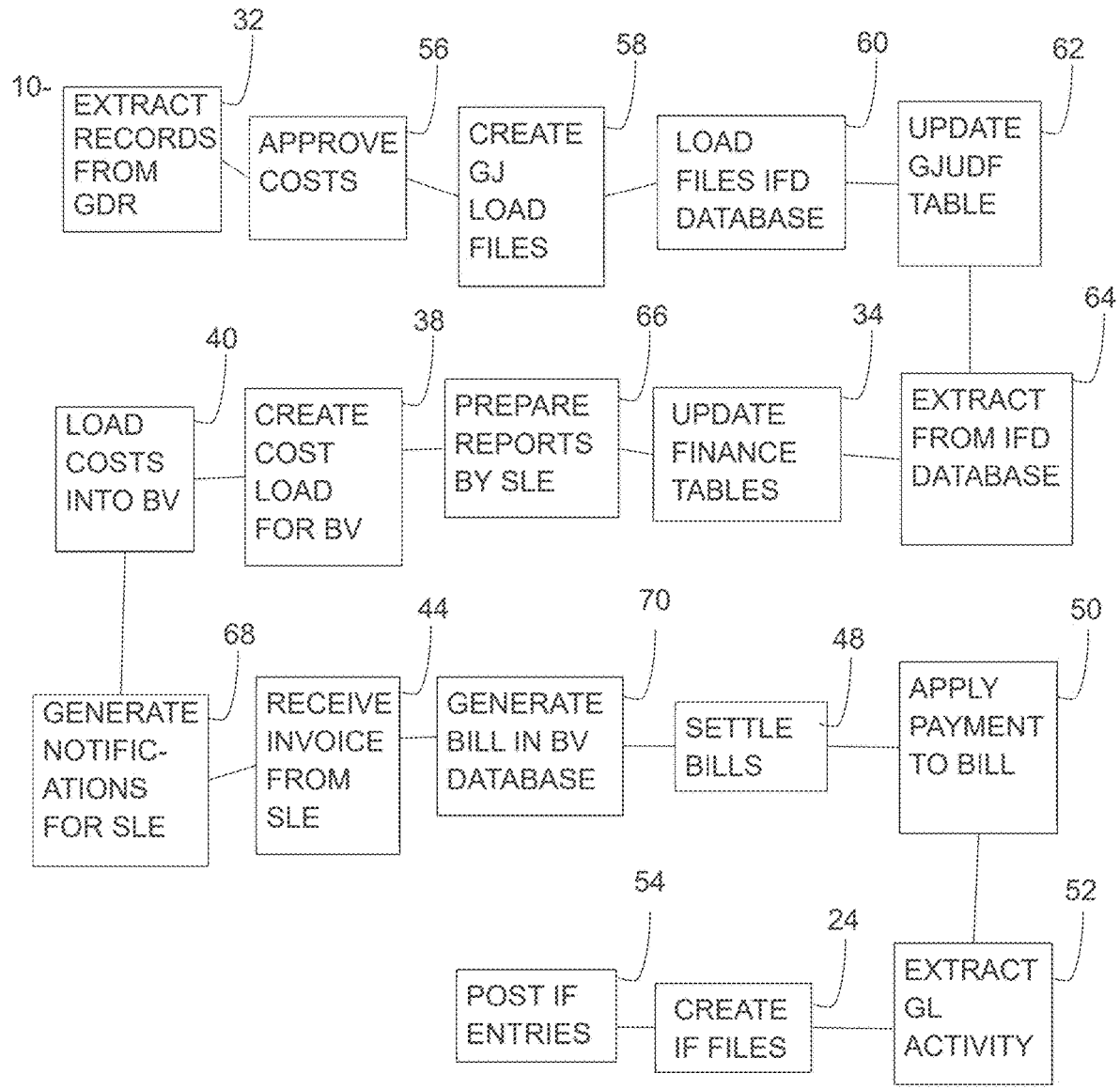
FIG. 3 is a Flow Chart of the present inventive system, Inter-firm Billing and Transfer Posting.

FIG. 3 flow chart includes the following abbreviations. GDR: business intelligence system.

FIG. 3 is a flowchart diagram of an embodiment the inter-firm billing of locally incurred global and regional costs, an embodiment of a process in the present invention, Improved System and Method for Inter-firm Billing and Posting 10. The process begins when records are extracted from the business intelligence system 32. Then costs are approved in the system by finance department 56. Then the GJ: General Journal load files in system 58. Files are then loaded in finance department database through ERP 60. Then, gjudf-general journal user defined field-table is updated through database server and task scheduled 62. Then, extraction from finance department database is performed 64. Next, finance tables are updated in ERP 34. Next, Reports are prepared by SLE in ERP 66. Then, cost load for BV is created 38. Next, the cost load for BV is loaded 40. Notifications are generated for SLE 68. The invoice is received from SLE 44. Then, bills are generated in BV database through ERP 70. Bills are then settled in ERP 48. Next, payments are applied to bills 50. Next, GL activity is extracted through ERP by an analyst 52. Then, IF files are created in ERP 24 and finally, IF entries are posted 54.

This business process has the ability to recognize Expense Transfers (Global Costs) accumulated on Global Cost Centers (Statistical Internal Orders) to Management and Statutory Ledgers of the SLE and RLE (B.V.) Legal Entity These Transfers will be billed via Inter-Firm Billing with the B.V.

This system has the ability to post Expense Transfers (Management Costs) accumulated on Global Cost Centers (Statistical Internal Orders) to Management Ledgers on SLE and RLE (B.V.) but only to Statutory Ledgers of the SLE. No entry is made on Statutory Ledger of the B.V. RLE. These transfers are not subject to settlement via Inter-Firm Billing.

Another unique aspect of this process is the ability to recognize Expense Transfers between Member Firms that post to Management and Statutory Ledger in the SLE and RLE that will be eventually settled via direct Billing between the two Member Firms. There may be no B.V. involvement in this transaction.

Figure 4:
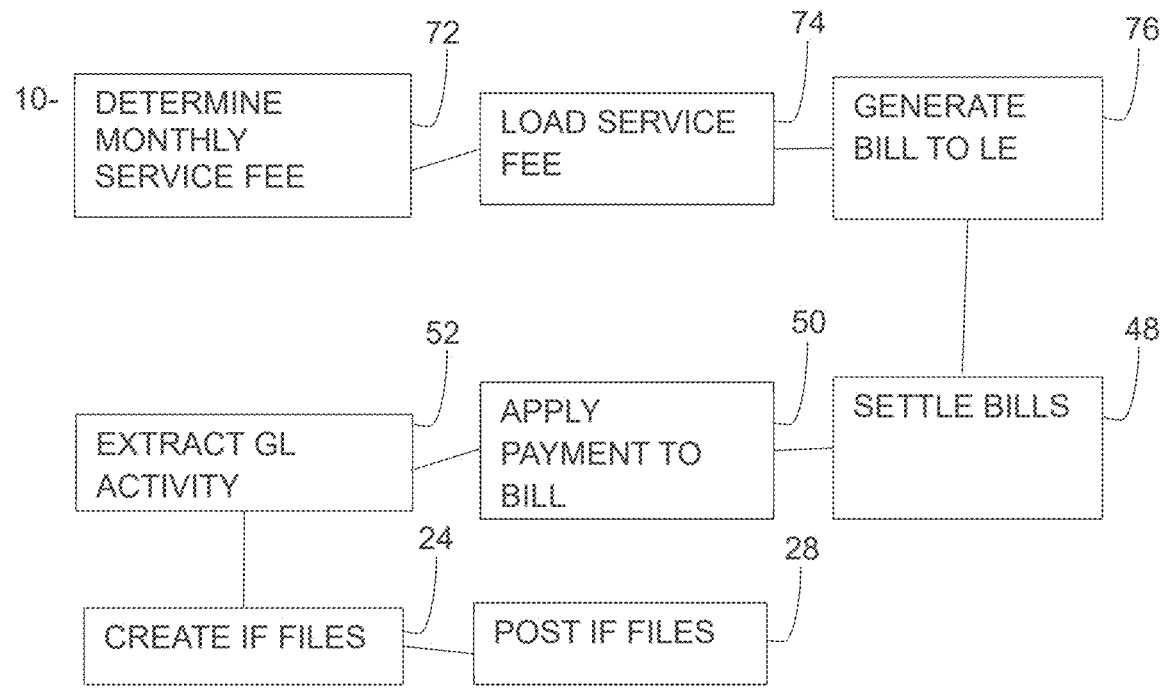
FIG. 4 is a Flow Chart of the present inventive system, Inter-firm Billing and Transfer Posting.

Shown now in FIG. 4 is a flowchart diagram of the business method for financial management of inter-firm billing service fees, a process in the present invention, Improved System and Method for Inter-firm Billing and Posting 10. The process begins when monthly service fees are determined in system 72. Then, service fees are loaded into ERP 74. Then, the bill is generated to LE through ERP 76. Next, bills are settled through ERP 48. Then, payment is applied to the bill in ERP 50. Next, GL activity is extracted through ERP 52. IF files are created 24 and then finally, IF files are posted 28.

Further, this process has the ability to recognize Asset, Liability and Equity Account Transfers between Member Firms that posts to Management and Statutory Ledgers for the SLE and RLE that are settled via direct invoicing between the two Member Firms. There may be no B.V. involvement in this transaction.

A unique feature of the present invention is its ability to recognize Asset, Liability and Equity Account Transfers between Member Firms that post to both management and statutory Ledgers in the SLE and RLE that will be eventually settled via Inter-firm billing with the B.V. (And in this scenario, Member Firms may have a billing relationship with B.V. or FIB. V.)

The Transfer Postings and Inter-firm Billing Processes has the ability to recognize Asset, Liability and Equity Account Transfers between Member Firms that post to the Management Ledger for SLE and RLE but only to Statutory Ledger for SLE. These transfers will NOT be settled via direct invoicing between the two Member Firms. There may be no B.V. involvement in this transaction. These items can be inter-country or intra-country.

The Process has the ability to recognize Expense Transfers between Member Firms that post to Management and Statutory Ledger in the SLE and RLE that will be eventually settled via direct Billing between the two Member Firms. There may be no B.V. involvement in this transaction.

Another unique aspect of the present invention is the ability to recognize Asset, Liability and Equity Account Transfers between Member Firms that post to Management and Statutory Ledgers for the SLE and RLE that are settled via direct invoicing between the two Member Firms. There may be no B.V. involvement in this transaction. Also, this process has the ability to recognize Asset, Liability and Equity Account Transfers between Member Firms that post to both management and statutory Ledgers in the SLE and RLE that will be eventually settled via Inter-firm billing with the B.V. (Note: Member Firms may have a billing relationship with B.V. or FIB.V.)

Another unique aspect of the present is its ability to recognize Asset, Liability and Equity Account Transfers between Member Firms that post to the Management Ledger for SLE and RLE but only to Statutory Ledger for SLE. These transfers will NOT be settled via direct invoicing between the two Member Firms. There is no B.V. involvement in this transaction. These items can be inter-country or intra-country.

The Transfer Processing and Inter-firm Billing Processes have the ability to recognize Expense Transfers between Member Firms that post to Management and Statutory Ledger in the SLE and RLE that will be eventually settled via direct Billing between the two Member Firms. There may be no B.V. involvement in this transaction. Also, the ability to recognize Asset, Liability and Equity Account Transfers between Member Firms that post to Management and Statutory Ledgers for the SLE and RLE that are settled via direct invoicing between the two Member Firms. There may be no B.V. involvement in this transaction.

This business method process has the ability to recognize Asset, Liability and Equity Account Transfers between Member Firms that post to both management and statutory Ledgers in the SLE and RLE that will be eventually settled via Inter-firm billing with the B.V. (Note: Member Firms may have a billing relationship with B.V. or FIB.V.)

This business method process has the ability to recognize Asset, Liability and Equity Account Transfers between Member Firms that post to the Management Ledger for SLE and RLE but only to Statutory Ledger for SLE. These transfers will NOT be settled via direct invoicing between the two Member Firms. There is no B.V. involvement in this transaction. These items can be inter-country or intra-country.

It also has the ability to post Fees worked by a Member Firm (SLE) that are Billed or collected by another Member Firm (RLE) in a different country. The SLE will Bill the B.V. and settle (receive payment). The Statutory postings may involve a Discount and be for an amount different from the Management postings. (Note: Member Firms may have a billing relationship with B.V. or FIB. V.)

The Transfer Processing and Inter-firm Billing Processes have the ability to post Fees or Costs worked by a Member Firm (SLE) that are billed or collected by another Member Firm (RLE). The SLE will Bill the RLE directly and settle. There may be no B.V. involvement. Also, this process has the ability to post Client Costs worked by a Member Firm (SLE) that are billed or collected by another Member Firm (RLE) in a different country. The SLE will Bill the B.V. and settle. (Note: Member Firms may have a billing relationship with B.V. or FIB. V.) This process also has the ability to post Client Costs billed or collected by a Member Firm (RLE) worked by a Member Firm in another country (SLE). The B.V. will Bill the RLE and settle. (Note: Member Firms may have a billing relationship with B.V. or FIB.V.)

This process has the ability to post Fees or Costs worked by a Member Firm (SLE) that are billed or collected by another Member Firm (RLE). The SLE will Bill the RLE directly and settle. There may be no B.V. involvement. As well as the ability, to post Client Costs worked by a Member Firm (SLE) that are billed or collected by another Member Firm (RLE) in a different country. The SLE will Bill the B.V. and settle. (Note: Member Firms may have a billing relationship with B.V. or FIB.V.) Further, this process has the ability to post Client Costs billed or collected by a Member Firm (RLE) worked by a Member Firm in another country (SLE). The B.V. will Bill the RLE and settle. (Note: Member Firms may have a billing relationship with B.V. or FIB.V.)

Figure 5:
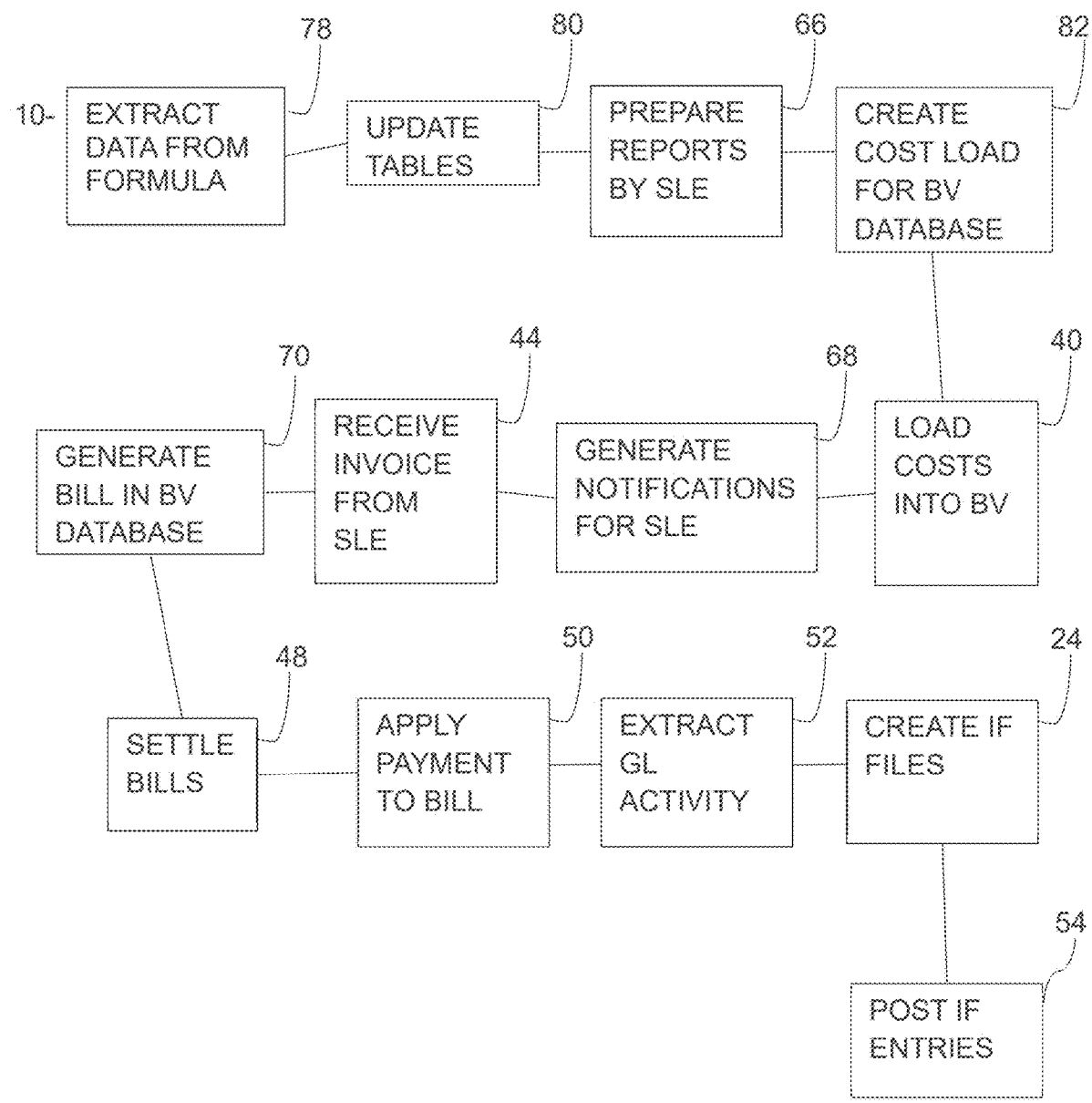
FIG. 5 is a Flow Chart of the present inventive system, Inter-firm Billing and Transfer Posting.

Shown now in FIG. 5, is a flowchart diagram of the process flow for financial management for inter-firm billing firm management time, a process in the present invention, Improved System and Method for Inter-firm Billing and Posting 10. The process begins with data being extracted 78. Then the finance tables are updated through ERP 80. Then, reports by SLE are prepared 66. Then, cost load for BV databases is prepared 82. Then, load costs into BV 40. Next, notifications are generated for SLE in ERP 68. Then, invoices are received from/by local office from SLE 44. Then, bill is generated in BV database 70. Then, bills are settled through ERP 48. Payments are then applied to bill 50. Next, GL activity is extracted 52. Then, IF files are created 24 and finally, IF entries are posted 54.

This process has the ability for Working Member Firm (SLE) VAT or tax regulations that require VAT to-be billed or collected on Time and/or Costs worked on non-local Clients. The billing Member Firm (RLE) will bill or collect the Fees, Costs and applicable Working Member Firm VAT from the Client. The Billing Member Firm will pay the VAT over to the B.V. The working Member Firm (SLE) will bill the B.V. for the collected Fees and collected or written-off Costs and applicable VAT. Partial payment of non-local Time and Costs should result in a proportionate amount allocated to non-local VAT. (Note: Member Firms may have a billing relationship with B.V. or FIB.V.)

Another unique feature of this process is the ability for Member Firms (SLE) to Bill the B.V. (RLE) for reimbursement based on the amounts approved by the Budget Group. The P&L effect of this transfer is only recognized on the Statutory Ledgers of the SLE and RLE. There is no P&L effect on the Management Ledger. (Note: Member Firms may have a billing relationship with B.V. or FIB.V.) (Timekeepers in Member Firms may work Time on various Firm initiatives. The Firm's Budget Group may reimburse them for their efforts. The amounts are determined annually and may not directly correlate to the Time worked. Certain GL accounts will be used for these transfers).

This process also has the ability to re-allocate the Global Charges accumulated in the B.V. back to the Member Firms. The B.V. (SLE) charges are estimated via a monthly Service Fee Agreement or Cost Pooling Agreement with the Member Firms (RLE). This may happen less frequently than monthly. Also, the estimates may result in the Member Firms billing the B.V. The P&L effect of this transfer is only on the Statutory Ledger of the SLE and RLE. There is no P&L effect on the Management Ledger. (Note: Member Firms may have a billing relationship with B.V. or FIB.V.)

Another aspect of this process is that Payments to Principals need to be recorded in the entity that makes the payment, even if the Timekeeper is in another office/entity for Statutory purposes. For Management purposes, payments to Principals follow their location per Timekeeper. Master File rather than the paying entity.

Figure 6:
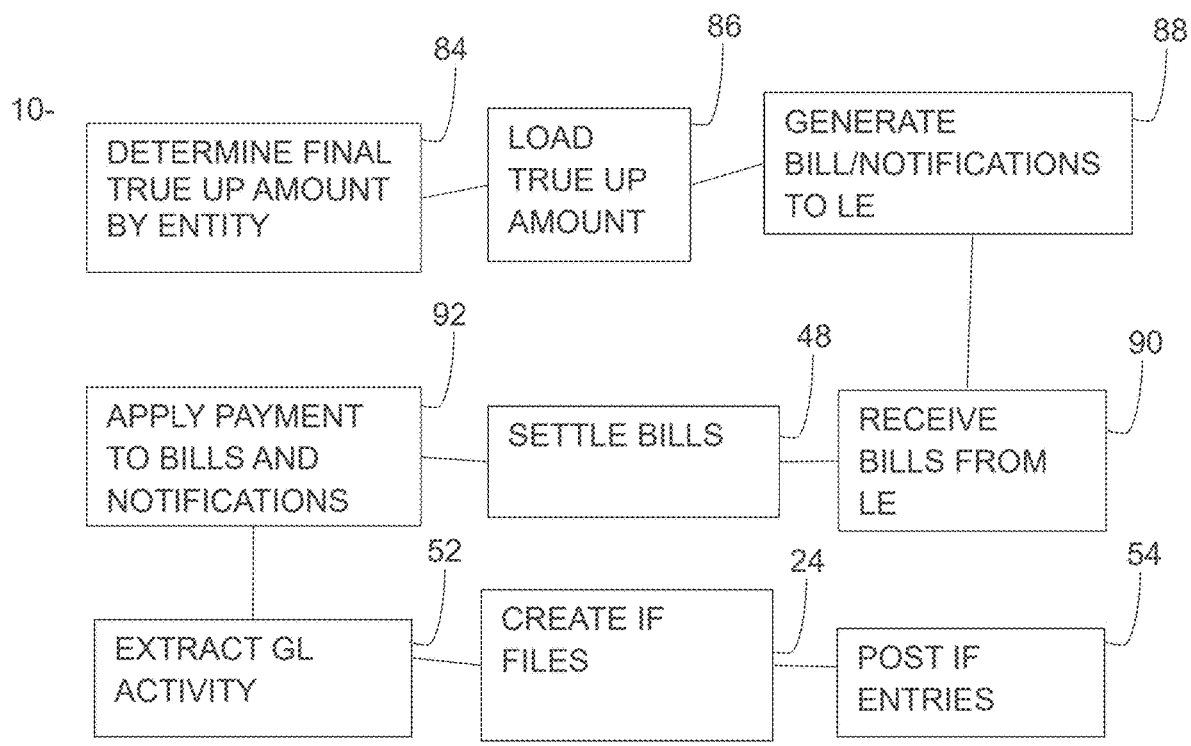
FIG. 6 is a Flow Chart of the present inventive system, Inter-firm Billing and Transfer Posting.

Shown now in FIG. 6 is a flowchart diagram for the financial management process flow for inter-firm billing and year-end true up, a process in the present invention, Improved System and Method for Inter-firm Billing and Posting 10. The process begins with final True up amount determined by entity 84. Then, amount to load up true up amount is in ERP 86. Then, bills are generated and notifications sent to LE 88. Next, bills received from LE 90. Bills are then settled 48. Next, payments are applied to bills and notifications sent 92. Then, GL activity is extracted 52. Next, IF files are created 24. Finally, IF entries are posted 54.

This process has the ability to True Up estimated billings. Monthly Service Fee Charges are estimates until the final fiscal year numbers are determined following the Final Management Year-End Close. A Final Billing (true-up) is performed to change the estimates to the Actual number True-up The billing may be a charge to the Member Firm or a charge against the B.V. A similar True-up is performed for Firm Management Time and Interest. Additionally, any True-up needs to indicate the fiscal year of the True-up. For instance, the True-up entry would post in the current period but this field would indicate the fiscal year the True-up occurred. (Note: Member Firms may have a billing relationship with B.V. or FIB.V.)

The process has the ability to inform/request reimbursement for the collections of misdirected Client payments. Misdirected Client payments are Client payments received by a Member Firm that belong to another Member Firm. The misdirected payment is paid to the B.V. by the collecting Member Firm (SLE) and then the originating Member Firm (RLE) bills the B.V. to reimburse the collection. (Note: Member Firms may have a billing relationship with B.V. or FIB.V.) And further has the ability to Bill for Interest charged on cash borrowings. Member Firms are occasionally charged or credited for Interest based on their cash positions. The B.V. manually calculates the Interest and charges or credits accordingly. This is Inter-firm activity and will need to be billed or settled. The P&L effect of this Transfer is only recognized on the statutory Ledgers of the B.V. and Member Firm being charged or credited. There is no P&L effect on the Management Ledger. Member Firm can act as an SLE when invoicing the B.V. or as an RLE when billed by the B.V. (Note: Member Firms may have a billing relationship with B.V. or FIB.V.)

Another unique feature of this process is its Ability to generate entries that only post to a specific ledger. For example, Management only entries are created to allocate Global Charges collected by B.V. to the Member Firms or Timekeepers. These entries will be posted into each Member Firms Management Ledger only. No postings will occur to the statutory Ledger.

The Transfer Processing and Inter-firm Billing Processes has the ability to meet intra-country requirements for professional firms, including but not limited to:

Some Legal Entities do not Bill IOB activity between Legal Entities in the same country; Some Legal Entities Bill IOB on a different basis other than what was collected from the Client (the basis used by B.V.); Some Legal Entities do not Bill when expenses are incurred for the direct benefit of another Legal Entity in the country; There are some countries that use a Central Billing Entity for all Billings and settlements; The same taxes that are added on Client billings may not always apply when Legal Entities are billing each other. Tax requirements for Intra-country Billing vary by Bill Type in some countries; Some countries have Withholding Tax on payments between entities in the same country; Some countries account for misdirected payments the same as inter-country misdirected payments and some do not. Intra-country Bill formats are not the same as Bills issued to B.V. in some counties.

A unique feature of this process is the B.V. (or FIB.V.) need the ability to automatically generate Bills to Member Firms for the monthly Inter-firm Activity. This will generally happen monthly although some Bill Types and Member Firms may require Billing at different times. Also, the B.V. should have the ability to create minimum and maximum thresholds for Billing, and should be able to include/exclude specific transactions on a Bill. (Note: Member Firms may have a billing relationship with B.V. or FIB.V. per Bill Type).

Another feature of the present invention is the Member Firms need the ability to automatically generate Bills to the B.V. (or FIB.V.) and other Member Firms for the monthly Inter-firm Activity based on unbilled activity or other defined rules. This will generally happen monthly although some Bill Types and Member Firms may require Billing at different times. Also, Member Firms should be able to create minimum or maximum thresholds for Billing, and should be able to include/exclude specific transactions on a Bill. Any applicable Tax/VAT/GST/IVA on Inter-firm Bills Bill must be assessed accordingly and included on the Bill. (Note: Member Firms may have a billing relationship with B.V. or FIB.V. per Bill Type) Further, Member Firms need the ability to settle B.V. Inter-firm Payables/Receivables via a Payment/Receipt. All Inter-firm Bills must be issued and settled in USD regardless of the currency of the underlying Inter-firm transactions. And Member Firms need the ability to settle B.V. Inter ?firm Payables/Receivables by charging a Loan Account.

A unique feature of this process is that Member Firms request settlement of Inter-firm Payables/Receivables via a payment request workflow. Utilizing a workflow ensures applicable authorizations are obtained prior to payment execution. Ability to record overpayment as an advance or down payment, by the receiving Legal Entity. The overpayment can then be used as an offset against a future Bill/settlement.

This process allows for Loan processing by Member Firms. Member Firms need to be able to loan fund, or borrow funds, from the B.V. The Loans need to be properly recorded on both the B.V. and Member Firm Ledgers. This process also allows for conversion. A detailed conversion plan should be created to seamlessly bring open items from the legacy B.V. database into ERP. General Ledger posting requirements for conversion data will be defined during realization. This process also fits Common Statutory Ledger. In order to verify that all Management Profit/Loss is distributed on the Statutory Ledger for the Fiscal Year, the Statutory Team needs a Common Statutory Ledger that will use the same Timing and Accounting Options for all Legal Entities as Modified Cash. Additional business rules will apply. For instance, Management Only transactions will not post to this Common Statutory Ledger.

This process allows for equity based requirements, for example, if the Offices in Germany had specific requirements those would be met. For example, Germany needs to include Management Only Global Activity as part of the regular Management/Statutory invoicing and be reimbursed by the B.V when typically Management Only Global Activity is not billed and settled with the B.V. This process will allow for this requirement to be met. An entity based requirement for China is met as well. China does not accept Inter Office Billing. The US pays all expenses for China. China makes profit remittances to the US to offset these expenses. Entity based requirements for London are met. London does not record Fee Transfers from London LLP (Clients/matters) to the Service Company that houses Associates. All Fees must be record to the LLP Ledger where Clients/Matters are maintained. Entity based requirements are met for Brazil. Brazil does not recognize all or certain Transfer Transactions on the Statutory Ledger but instead recognizes the net of all Inter-Company transactions. And entity based requirement for Bangkok. Bangkok requirements are a combination of China and Brazil requirements. Bangkok records only a portion of its net Inter-firm activity in the P&L and the rest of the net activity is recorded in a Hong Kong company owned by Bangkok. Bangkok "transfers" for anything other than Inter-Office Billing needs to post to a Balance Sheet account. Then once a year, a Bill is issued for part of the balance. The rest of the balance is billed by the Hong Kong Company. Entity based requirement for the United States are met as well. For example, in agreements not involving B.V. The US incurs a monthly charge and transfers to UK for Management purposes. For statutory purposes, the expense stays in the US. The US will charge UK at a later time for Statutory purposes under second agreement. For requirements that cannot perform a transaction with B.V. for the Statutory Ledger, B.V. transaction can be performed by the Management Ledger. And when Global Partners are assigned to the US for Global Projects. For Statutory purposes, these Costs are included in the Global Cost pool. The US pays Global Partners as a distribution and the US is reimbursed for the distribution. The process has the ability to meet entity-based requirements in Brazil and Argentine. For these countries, the process has the ability to generate Interim Bills as part of Inter-firm Billing for purposes of cash flow management. These are all preselected criteria given as an example to show the intricacies of this process in order to allow for a more streamlined business process, these processes can include different criteria based on the needs of the Professional Firm and will all be completed by the process.

This process has the ability to invoice on behalf of another (same country or different county), The process can generate a Bill from one Member Firm on behalf of two or more Member Firms when billing the B.V. For example, if Tokyo has two Legal Entities 1 and 2, and 1 bills the B.V. on one Bill for the total open items of 1 and 2.

A unique feature of this process is the ability to reference a particular Timekeeper Attribute in order to determine which Legal Entity will be represented as the Working Legal Entity for Inter-firm Billing. For example, if all Timekeepers are setup in the Moscow/St. Petersburg entities. Work done by a Russian National on a France matter is billed through the Collegium. Russian Timekeepers that are NOT Russian Nationals do NOT bill through the Collegium. France/Russia have a direct billing relationship where France is collecting for Moscow/St. Petersburg time.

Another unique feature this process is the ability to combine multiple Bill Types (Time, Costs, Interest, Service Fee, etc.)

This process has the ability to include Mark-ups on Inter-firm Bills. The mark-ups will only be reflected on the Statutory Ledger. They will not be reflected on the Management Ledger. Mark-ups are required by US (PC), UK, Turkey, etc.

This process has the ability to perform inter-office billing (JOB) discount adjustment. It has ability to post an IOB discount adjustment for a Member Firm. For example, monthly discount used for Poland is an estimate. Poland determines the exact amount needed for the annual discount in December for the previous year-end. An adjustment to the discount needs to be posted to bring the annual estimated charge to the required amount. For example, assume a 10% disc is used all year. The actual discount later calculated may need to be 8.5%. A posting for 1.5% needs to be included with the Final IOB Bill to the Poland Member Firm.

Another unique feature of this process is that is provides for the ability to report/inquire on Transfer Processing and Billing between Member Firms and B.V. Further, appropriate Bill templates must be used to meet B.V. and Member Firm Billing requirements. Variances in templates range from general layout requirements, local currency values presented, tax information presented, local language variations, etc. For example: Amsterdam Bill to B.V. and B.V. Bill to Amsterdam is in USD but must show VAT in Euro.

Yet another feature of this process is the Tax Bill Numbers. Member Firms invoicing B.V. require their local Tax Bill number range to be used. For example, countries with pre-printed paper stock require a continuous numbering sequence for Client and Inter-firm Bills. Another feature concerns Prior Period Adjustments (PPA). A solution (or process) is needed that will treat PPA (that result in intercompany transfers) on the management Ledger differently from the postings to the Statutory Ledger. Postings occur in the Management Ledger with June 30th posting date after the period 12 is closed which will be posted period 13 in ERP. For the Statutory Ledger, many Member Firms would require them to be posted for the month when they are entered. For Inter-Firm Billing purposes, these transactions need to be included in Bills that are generated in the subsequent fiscal year in order to facilitate accurate and timely VAT reporting Further, the B.V. may require Global Cost PPA to be placed on a separate Bill from regular global Costs. The may apply to Cost/Balance Sheet transfers as well.

This process has the ability to accommodate Account Based Exceptions. There are transactions that are billed directly between two entities. For example: A special direct Bill is needed so we use a certain general ledger account to do the Cost/Balance Sheet Transfer and this item will be separately Billed. We would then need to capture transactions between two particular Legal Entities that involve certain accounts. This process also has the ability to restrict Cross Company Transfers allowed for certain GL accounts. Ability to exclude specific Legal Entities from inter-company postings. Ability to restrict which Legal Entities can transfer IOB Time/Cost. Ability to issue Inter-firm Bill at summary level and must have the ability to display and report details of the Individual transactions as well.

Here are examples of some of the various steps involved that make up the Financial Management Method in the present invention. The examples are of the process, the process can be completed without some of the roles described, or different persons playing those roles, the roles are simply provided for a clear description. For example, when the chart says an action is completed by the BV analyst (which is a Financial Analyst) this is an example, and the role can be completed by other individuals including, but not limited to: accountants, billers, etc. Further, some of the flow charts depict examples using the Swiss Verein structure, but of course can apply to Companies, Corporations, LLC, or other professional structures.

What is claimed is:

1. A computer system configured to process billing transactions for an organization comprising a plurality of member firms located in different countries, the computer system comprising:

a plurality of computers located in a plurality of countries, each computer of the plurality of computers being associated with one of the plurality of member firms; and an application server, in communication with the plurality of computers, comprising a processing device and a non-transitory storage medium for storing instructions that when executed by the processing device cause the processing device, in real time, to:

enable access to a first sending entity management ledger and a first sending entity statutory ledger for a first sending legal entity of the plurality of member firms, a second sending entity management ledger and a second sending entity statutory ledger for a second sending legal entity of the plurality of member firms, and a receiving entity management ledger and a receiving entity statutory ledger for a receiving legal entity of the plurality of member firms;

for each of the plurality of computers located in the plurality of countries, automatically determine an amount of time that a computer application is open, active and then closed and generate a plurality of time entries for a plurality of timekeepers from the first sending legal entity and the second sending legal entity using the determination, the plurality of time entries including at least a first local office code or a second local office code, a billing office code, and an amount of time worked based on the amount of time that the computer application is open, active and then closed;

generate, using the first local office code, the second local office code, the billing office code, and the amount of time worked associated with the plurality of time entries received from the plurality of computers, billing transactions based on contract terms between the organization and the plurality of member firms, and each member firm and its respective clients, wherein the contract terms include rules for transferring payment between the member firms both through and not through an intermediary involved in a common transaction; and determine a first country for the first sending legal entity and transfer payment for first billing transactions directly to the first sending legal entity;

determine a second country for the second sending legal entity and transfer payment for second billing transactions to the intermediary;

automatically trigger upon payment of the first billing transactions being received by the receiving legal entity directly from the first sending legal entity, and based at least on an event type, the first local office code and the billing office code, transfer processing that causes the billing transactions that cross both the first sending legal entity and the receiving legal entity to be posted to the first sending entity management ledger and the first sending entity statutory ledger for the first sending legal entity and the receiving management ledger and the receiving statutory ledger for the receiving legal entity; and automatically trigger upon payment of the second billing transactions being received by the intermediary, without the intermediary processing the time entries entered by the plurality of timekeepers, and based on at least the event type, the second local office code and the billing office code, transfer processing which causes the billing transactions that cross both the second sending legal entity and the receiving legal entity to be selectively posted to the second sending entity management ledger and the first second sending statutory ledger for the second sending legal entity and the receiving entity management ledger for the receiving legal entity, but not posted to the receiving entity statutory ledger for the receiving legal entity.

2. The computer system of claim 1, the storage medium further comprising instructions that, when executed by the processing device, cause the processing device to assign corresponding local statutory tax requirements to at least one member firm of the plurality of member firms.

3. The computer system of claim 1, wherein the contract terms include an assigned currency for the member firm, international trade laws that correspond to the member firm, and tax codes that correspond to the member firm.

4. The computer transaction system of claim 1, the storage medium further comprising instructions that, when executed by the processing device, cause the processing device to automatically adjust profit and loss in real time for each transaction by adjusting for the payment that will be distributed to the intermediary.

5. The computer transaction system of claim 1, the storage medium further comprising instructions that, when executed by the processing device, cause the processing device to recognize an asset transfer, a liability transfer, and an equity account transfer between the member firms.

6. In an application server, a method for processing billing transactions for an organization comprising a plurality of member firms located in different countries, the method comprising:

enabling access to a first sending entity management ledger and a first sending entity statutory ledger for a first sending legal entity of the plurality of member firms, a second sending entity management ledger and a second sending entity statutory ledger for a second sending legal entity of the plurality of member firms, and a receiving entity management ledger and a receiving entity statutory ledger for a receiving legal entity of the plurality of member firms;

for each of a plurality of computer devices in which each computer of the plurality of computer is associated with one of the plurality of member firms, automatically determining an amount of time that a computer application is open, active and then closed and generating a plurality of time entries for a plurality of timekeepers from the first sending legal entity and the second sending legal entity using the determination, the plurality of time entries including at least a first local office code or a second local office code, a billing office code, and an amount of time worked based on the amount of time that the computer application is open, active and then closed;

generating, using the first local office code, the second local office code, the billing office code, and the amount of time worked associated with the plurality of time entries received from the plurality of computers, billing transactions based on contract terms between the organization and the plurality of member firms, and each member firm and its respective clients, wherein the contract terms include rules for transferring payment between the member firms both through and not through an intermediary involved in a common transaction;

determining a first country for the first sending legal entity and transferring payment for first billing transactions directly to the first sending legal entity;

determining a second country for the second sending legal entity and transferring payment for second billing transactions to the intermediary;

automatically triggering upon payment of the first billing transactions being received by the receiving entity directly from the first sending legal entity, and based at least on an event type, the first local office code and the billing office code, transfer processing that causes the billing transactions that cross both the first sending legal entity and the receiving legal entity to be posted to the first sending entity management ledger and the first sending entity statutory ledger for the first sending legal entity and the receiving management ledger and the receiving statutory ledger for the receiving legal entity; and automatically triggering upon payment of the second billing transactions being received by the intermediary, without the intermediary processing the time entries entered by the plurality of timekeepers, and based on at least an event type, the second local office code and the billing office code, transfer processing which causes the billing transactions that cross both the second sending legal entity and the receiving legal entity to be selectively posted to the second sending management ledger and the second sending statutory ledger for the second sending legal entity and the receiving entity management ledger for the receiving legal entity, but not posted to the receiving entity statutory ledger for the receiving legal entity.

7. The method of claim 6, further comprising, assigning corresponding local statutory tax requirements to at least one member firm of the plurality of member firms.

8. The method of claim 6, wherein the contract terms including an assigned currency for the member firm, international trade laws that correspond to the member firm, and tax codes that correspond to the member firm.

9. The method of claim 6, further comprising, automatically adjusting profit and loss in real time for each transaction by adjusting for the payment that will be distributed to the intermediary.

10. The method of claim 6, further comprising, recognizing an asset transfer, a liability transfer, and an equity account transfer between the member firms.

11. The method of claim 6, wherein the event type comprises a cash event including a collection of client fees or payment of expenses by the first or second sending legal entity on behalf of the receiving legal entity.

12. The method of claim 6, wherein the event type comprises a non-cash event including recording, writing-off or writing down of client costs by the first or second sending legal entity on behalf of the receiving legal entity.

13. The computer transaction system of claim 1, wherein the event type comprises a cash event including a collection of client fees or payment of expenses by the first or second sending legal entity on behalf of the receiving legal entity.

14. The computer transaction system of claim 1, wherein the event type comprises a non-cash event including recording, writing-off or writing down of client costs by the first or second sending legal entity on behalf of the receiving legal entity.

* * * * *